US005953232A

United States Patent [19]

Blaimschein

[11] Patent Number: 5,953,232

[45] Date of Patent: Sep. 14, 1999

[54] METHOD OF CUTTING OUT BLANKS FROM, IRREGULAR WORKPIECES OF SHEET MATERIAL

[75] Inventor: Gottfried Blaimschein, Steyr, Austria

[73] Assignee: Gfm GmbH, Steyr, Austria

[21] Appl. No.: 08/829,489

[22] Filed: Mar. 27, 1997

[30] Foreign Application Priority Data

Apr. 2, 1996 [AT] Austria ........................ 590/96

[51] Int. Cl.[6] ........................ G06F 19/00

[52] U.S. Cl. ........................ 364/474.13; 364/470.5; 382/111

[58] Field of Search ........................ 364/470.05, 470.06, 364/474.13; 382/111; 165/244; 378/123; 417/120; 29/743

[56] References Cited

U.S. PATENT DOCUMENTS

| | | | |
|---|---|---|---|
| 4,725,961 | 2/1988 | Pearl | 364/474.13 |
| 4,982,437 | 1/1991 | Loriot | 382/111 |
| 5,089,971 | 2/1992 | Gerber | 364/470.05 |

FOREIGN PATENT DOCUMENTS

| | | |
|---|---|---|
| 37 09 373 | 10/1987 | Germany . |
| 41 11 304 | 10/1991 | Germany . |

*Primary Examiner*—Paul P. Gordon
*Assistant Examiner*—Chad Rapp
*Attorney, Agent, or Firm*—Collard & Roe, P.C.

[57] ABSTRACT

A method of cutting out blanks from workpieces of a sheet material comprises the steps of spreading the workpieces on a supporting surface of an imaging apparatus, manually marking the characteristic features of the workpieces to obtain markings, assigning a workpiece identifier to each spread workpiece, photographing the contour of the workpieces, the markings and the workpiece identifiers to obtain corresponding data, entering the obtained data into a computer having a memory having stored therein data as to number, contour and quality requirements of the blanks, the computer computing a pattern on the basis of the entered and stored data, storing the computed pattern and allocating the stored pattern to the workpieces identified by the workpiece identifiers, placing a respective workpiece on a working surface of a cutting apparatus in a determined position, photographing the one workpiece and the determined position thereof to obtain corresponding data, entering the obtained data into the computer, the computer computing the determined position and selecting the stored pattern allocated to the one workpiece, repositioning the one workpiece in a position adjusted to the selected stored pattern, and cutting the one workpiece in response to a control program responsive to the selected stored pattern allocated to said workpiece.

14 Claims, 2 Drawing Sheets

METHOD OF CUTTING OUT BLANKS FROM, IRREGULAR WORKPIECES OF SHEET MATERIAL

BACKGROUND OF THE INVENTION

1. Field of the Invention

This invention relates to a method of cutting out blanks from flat, irregular workpieces, in particular leather pieces, in which the contour and the flaws of the workpieces spread on the supporting surface of an imaging arrangement are optically detected by a camera, where the flaws of the workpieces and preferably other workpiece-own features characteristics of the workpieces are marked manually, and the markings together with the contour and a workpiece identifier are detected and the corresponding data are entered into a computer, then on the basis of these data and the data stored in the computer as to number, design and quality requirements of the blanks a pattern is prepared by the computer for each workpiece and stored in allocation to the respective workpiece, where the detected workpiece identifier of a workpiece is used as workpiece identification for the allocation of the computed pattern, whereupon the workpieces are cut by a cutting means that can be activated by the computer in accordance with a control program taking into account the allocated patterns.

When industrially cutting out blanks from leather pieces or other irregular flat pieces, it is not only desired to achieve an optimum utilization of material, but also an economic nesting, where nesting is understood to be a combination of the various blanks to form a pattern individually adjusted to the respective workpiece. Since in such nesting, the flaws of the workpieces such as holes, surface structure and color, stretching direction or the like must of course be taken into account, an optimization of the utilization of material mostly involves an increase in care and time required for nesting.

2. Description of the Prior Art

For automating this nesting it is known in accordance with and U.S. Pat. No. 4,725,961 to digitize the contour of the workpiece by means of a computer and display the same on the screen of a layout unit, so that on the screen an interactive nesting can be performed by an operator by means of stored blank shapes. However, both for digitizing and for cutting the workpiece must remain on the same supporting surface of a working table, there will be long nesting times, and since flaws are detected only due to digitizing, the nesting result remains unsatisfactory.

In accordance with the U.S. Pat. No. 4,982,437 and the DE-A-41 11 304 as well as the U.S. Pat. No. 5,089,971 it is also already known to manually mark the flaws of a workpiece and optically detect the contour and the manual markings and enter the corresponding data into a computer for preparing the pattern, where the DE-A-41 11 304 and the U.S. Pat. No. 5,089,971 already propose to separate the nesting and cutting operations and also use the detected workpiece identifiers of a workpiece as workpiece identification for the allocation of the computed pattern for the cutting operation. It is, however, necessary to place the workpieces to be cut on the working surface of the cutting means in a position exactly corresponding to the position for the optical detection in the imaging arrangement, which mostly requires separate workpiece supports for the workpieces, which in adjusted positions can be mounted both on the supporting surface of the imaging arrangement and on the working surface of the cutting means. In addition, it is also possible to indicate the correct position of the workpiece on the working surface of the cutting means by a projection of the workpiece contour activated by the computer, so as to achieve the required allocation between workpiece and control program stored in the computer and predetermined by the pattern. Handling the workpieces by means of separate workpiece supports or properly positioning the workpieces on the cutting table in accordance with predetermined projections, however, involves a considerable amount of time and effort and endangers the quality of the cutting operation through an incorrect position of the workpieces on the working surface of the cutting means.

SUMMARY OF THE INVENTION

It is therefore the object of the invention to eliminate these deficiencies and provide a method as described above, which not only provides for an optimized nesting and a cutting of possibly temporarily stored workpieces largely separate from the nesting operation, but above all ensures a substantial simplification of the cutting operation by avoiding cutting errors as a result of positional differences between actual workpiece position and desired position in dependence on the control program. Moreover, the invention provides a simple method of exactly and properly holding down the workpieces for the actual cutting operation.

This object is solved by the invention in that for cutting a workpiece, the contour and/or the markings together with the workpiece identifier of the workpiece placed on the working surface of a cutting means, and in addition the actual position on the working surface are optically detected, and the corresponding data are entered into a computer which on the one hand determines the actual position in a system of coordinates representing the working surface and on the other hand detects the pattern associated to the detected identifier from the stored patterns and provides it in a relative position adjusted to the detected coordinate position of the contour and/or marking for the control program so as to activate the cutting means.

Since human experience and knowledge have turned out to be far superior to a mechanical recognition of flaws, the flaws of a workpiece placed on the working surface are manually marked by the operator who places the workpiece on the working surface, where by further markings, for instance by a bar code, may indicate other individual workpiece features, such as different qualities and quality ranges, surface structure, color and the like, where by a quick and reliable flaw detection and classification is achieved as compared to mechanical recognition. By means of a camera, the contours of the respective workpiece and the features represented by the marking as well as possibly a separate code as workpiece identifier are quickly detected in one image and can be entered and stored in a computer in an appropriate data format. It is sufficient to very briefly image the respective workpieces, which immediately thereafter can be removed from the supporting surface of the imaging arrangement without placing them on special workpiece supports and can be transferred to a temporary store. When a large enough number of workpieces has been detected and the data thereof have been stored, the computer will perform nesting on the basis of a suitable computing program with the previously entered data on the blanks, which possibly can likewise be entered via an optical detection, where due to the multitude of workpieces an optimization of the utilization of material for all these workpieces is possible, and the blanks best suited for the associated pattern will be selected individually for each workpiece in accordance with the features characteristic of the workpiece. In this way, a specific, optimized pattern is computed for each workpiece, and the allocation between workpiece and pattern is effected by the respective workpiece identifier. The patterns associated with the respective workpieces will be stored and are then available for the subsequent cutting operation for cutting out the blanks from the respective workpieces as a basis for a corresponding control program. When one of the workpieces is now placed on the working surface of an appropriate cutting means for cutting purposes, the respective contour and marking of the workpiece and the identifier thereof as well as its actual position on the working surface will be detected by a camera, which may be the same as during the first detection, and entered into the computer, which on the basis of this identifier selects the associated pattern, and this selected pattern will be provided as master control program in a coordinate position adapted to the respective relative position of the workpiece lying on the working surface. Since the workpieces placed on the working surface can have any position relative to the working surface, the computer must effect a relative movement of the contour and/or marking when comparing the same with the stored contours and/or markings until there is a correspondence, and must then bring the pattern found into a relative position associated with the coordinate position predetermined by the actual position of the workpiece on the working surface, so that then the control program determined therefrom can activate the cutting means corresponding to the actual position of the workpiece. For identifying a workpiece, special codes or the like can be applied on the workpiece, but contour and/or markings of the workpiece itself can be detected and processed by the computer as workpiece identifier. During the nesting operation, there is achieved a proper flaw detection and workpiece classification and thus an economic and nevertheless optimized nesting, which is followed by a convenient preparation of the cutting operation, which can be achieved quite easily, and then a fully automatic cutting operation, where the inventive step of adjusting the control program for activating the cutting means to the respective actual position of the workpiece and not, as to this date, adapting the actual position of the workpiece to the control program adjusted to a certain desired workpiece position, provides for the desired improvement and simplification of the entire cutting operation.

This method can of course not only be applied to leather cutting, but with the same success to other sheet materials, such as honeycomb, prepregs or the like, and is in particular also suited for the economic utilization and processing of residual material produced in different amounts.

To further optimize the nesting operation by making use of human experience, some of the blanks may be interactively combined to groups in the computer, and these groups of blanks may each be provided in the computer as a unit for preparing a pattern. Since man has the capacity of seeing figures and of skillfully combining shapes, suitable combinations of figures, which the operator can immediately recognize, can be picked out and then be preprogrammed for the computer as a unit for the actual nesting operation, which will shorten the computing operations during the preparation of the pattern. This interactive formation of groups can be performed independent of the manual marking of flaws or special workpiece identifiers, but on the whole nesting will be improved considerably and the entire process will be accelerated.

Due to the flexibility of the workpiece it is possible that when placing the workpiece on the working surface of the cutting means the workpiece contour adopts a different contour than when originally placing the workpiece on the supporting surface of the imaging arrangement, so that the computer might have difficulties in identifying the workpiece. To eliminate these difficulties, the computer may find out the workpiece identifier with the least differences from the stored work piece identifiers, when there is no correspondence between a detected contour and/or marking of a workpiece to be cut and a contour and/or marking stored as workpiece identifier from the stored workpiece identifiers, and newly prepare the associated pattern in consideration of the differences, so that a difference can automatically be compensated when applying the workpieces. The computer will only change the pattern individually and adapt it to the respective workpiece by making use of the existing blanks.

In the case of an only partly existing correspondence between a detected contour and/or marking of a workpiece to be cut and a contour and/or marking stored as workpiece identifier, the computer can find out the workpiece identifier with the largest correspondence from the stored workpiece identifiers and newly prepare the associated pattern for the differing partial area, which provides for an economic adaptation. Apart from this it might also request to change the position of the applied workpiece in the differing partial area, preferably by indicating the respective stored contour and/or marking, so that in the case of partly differing contours and/or markings the operator provides for a correction of the actual position of the applied workpiece, and the proper cutting operation is also ensured without newly preparing a pattern.

In the case of workpieces that are delicate as regards their contour or other features, so that problems with respect to the identification after a placement on the working table can be expected, the operator may facilitate the identification by the computer by providing for a suitable identifier of the workpieces placed on the supporting surface of the imaging arrangement, where the computer will then find out the contour associated with this identifier from the stored contours when detecting such specific identifier of a workpiece placed on the working surface of the cutting means, and will at least partly indicate the same, so that the identification is effected by means of the workpiece identifier and a differing part of the workpiece can immediately be brought in the proper position, so as to avoid inaccuracies in the allocation of a pattern. When detecting a corresponding specific identifier of a workpiece placed on the working surface of the cutting means, the computer might also find out the pattern associated with this identifier from the stored patterns and, when there is no correspondence between the stored contour and the detected contour of the applied workpiece, convert the same for adapation to the applied workpiece, which in turn also provides an optimized pattern for workpieces with a contour changed in accordance with the supporting surface.

Advantageously, a classification of the workpiece is performed by means of a certain workpiece identifier, and the computer prepares a pattern for this workpiece in accordance with a computing program taking into account the respective classification. In this way, previously known particularities of certain workpieces can be taken into account, and the individual preparation of the patterns can already be adapted to these particularities in terms of programming.

When this computing program is changed in dependence on the contour of the workpiece, an optimization of nesting is achieved here as well, as the previously known particularities, such as quality and color ranges, are mostly proportional to the workpiece size and thus vary within their limits with the same arithmetic distribution depending on the workpiece contour. In this way, the general differences in the type and quality of the leather of animals of different breed and origin can optimally be taken into account right from the start.

For cutting out the blanks themselves, the workpieces placed on the working surface of the cutting means must be properly fixed in their respective actual position, for which purpose it is known from EP 0,566,817 A to hold the workpieces down on the working surface by subjecting them to a vacuum, where for applying the vacuum the working surface includes a plurality of suction zones arranged one beside the other in a raster and each connectable to a vacuum source via a shutoff member, and the shutoff members can be activated individually and/or in groups. To minimize the effort for the application of a vacuum and to keep the demands placed on the vacuum source within economic limits, the contour and the existing actual position of a workpiece spread on the working surface are optically detected by means of a camera in accordance with a special embodiment of the invention, and the corresponding data are entered into a computer, which by activating the shutoff members selected in dependence on these data only subjects those suction zones to a vacuum which are disposed in the area of application of the workpiece. In this way it is ensured that the suction zones actually contributing to the support of the workpiece are connected with the vacuum source, and the workpiece is actually properly held down, but that the suction zones lying outside the area of application of the workpiece remain inactive, and it is thus avoided that major amounts of secondary air are sucked in and the vacuum source might collapse. Such process is optimally suited for performing all kinds of cutting operations, of course also the cutting operation described above, according to which the camera associated with the cutting means optically detects the contour of the applied workpieces and enters the corresponding data into the computer, which is additionally processing these data for the activation of the suction zones.

When the working surface is subdivided into partial areas, and the suction zones are subjected to a vacuum in partial areas by means of the computer in dependence on the cutting line, the influence of secondary air in the edge portion of the workpiece as a result of the only partly covered suction zones can be reduced, as these suction zones have merely been activated in the respectively activated partial area, which partial areas are activated one after the other or also in an overlapping manner corresponding to the cutting operation.

A further improvement is achieved in that during cutting the computer applies a vacuum to the suction zones completely lying within the area of application for the entire period of the cutting operation, and to the suction zones partly protruding in the area of application only in dependence on the cutting line. In this way the entire workpiece is properly held down, and during cutting the edge portions are additionally subjected to the application of a vacuum.

A further possibility for an economic application of a vacuum is achieved in that the computer applies a vacuum to the suction zones within a certain area around the cutting tool, so that actually only the workpiece parts lying near the active cutting tool are held down, whereas the remaining portions remain without application of a vacuum.

BRIEF DESCRIPTION OF THE DRAWING

In the drawing, the subject-matter of the invention is represented by way of example, wherein.

DESCRIPTION OF THE PREFERRED EMBODIMENT

Figure 1:
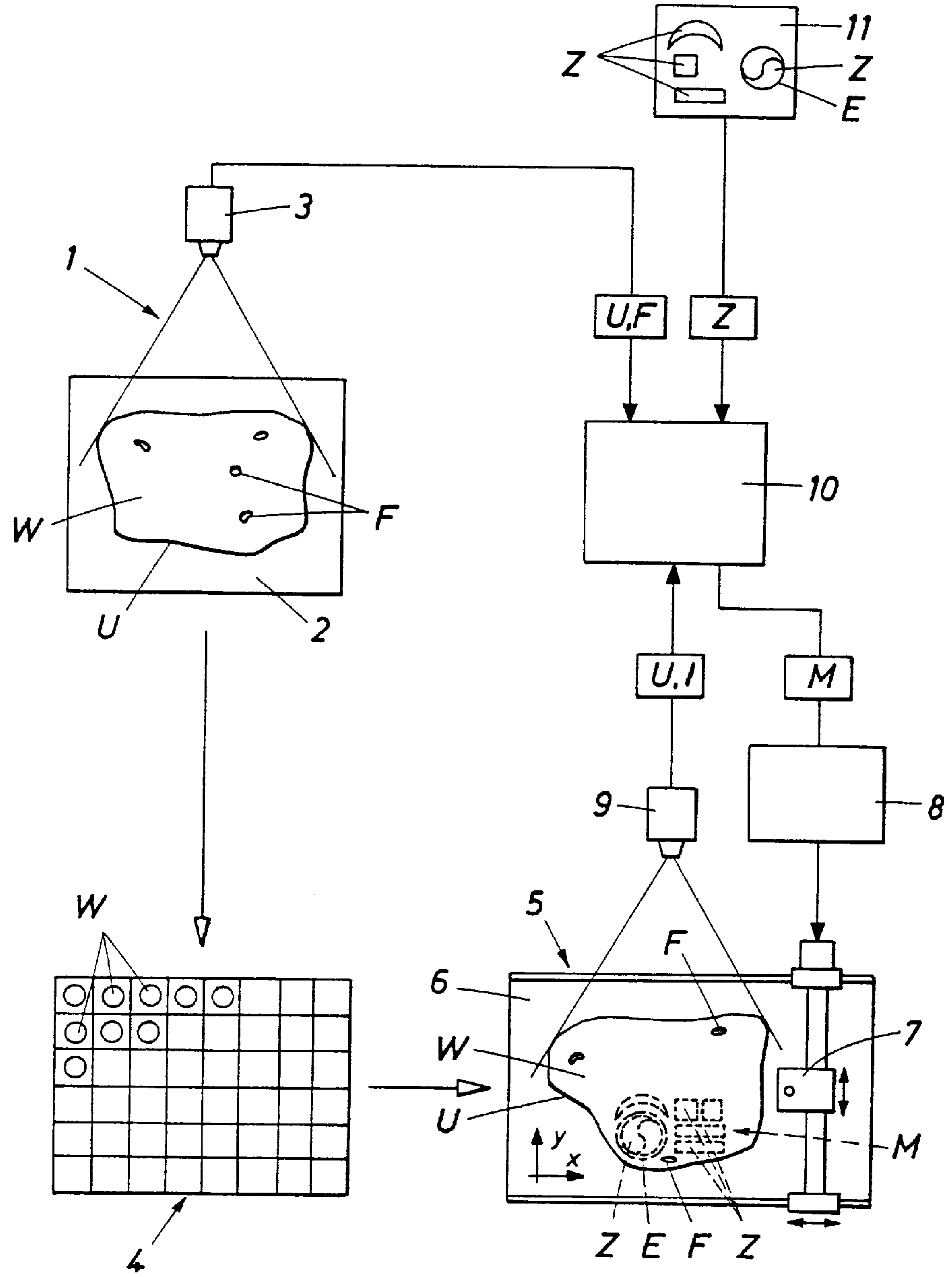
FIG. 1 diagrammatically illustrates cutting out of blanks by the method of the invention, FIG. 2 schematically represents the cutting means for performing the inventive method in a top view.

For economically cutting out blanks Z from leather pieces or other irregular workpieces W of sheet material there is provided a imaging arrangement 1 with a supporting surface 2 for the workpieces W and a camera 3 for the optical detection of the workpieces, a temporary storage device 4 for the temporary storage of the workpieces W before the actual cutting, and a cutting means 5 with a working surface 6 as well as a cutting unit 7 movable over the working surface 6 and an associated control means 8. A camera 9 is also associated with, which serves to detect the workpieces. The input of a computer 10 with a suitable computer unit and memory unit is connected with the two cameras 3, 9 and with an input means 11 for storing data and interactively engaging in computing operations, and its output is connected to the control means 8 of the cutting unit 7 and a display means not represented in detail.

The available workpieces W are individually placed on the supporting surface 2 of the imaging arrangement 1, and their flaws F and possibly other features characteristics of the workpiece or additional processing information are manually marked by the operator in the form of a marking, such as geometric signs, color signs, bar code or the like. The contour U of the workpieces W as well as the markings F are optically detected by means of the camera 3, and corresponding data are entered into the computer 10 and stored. The workpiece W is removed from the imaging arrangement 1 and placed into the temporary storage device 4. When a large enough number of workpieces W has been detected and their contours U and markings F have been stored, the computer 10 will produce a corresponding pattern M by comparing the contour and marking data with the data representing the number, design and quality requirements of the blanks Z for each workpiece W entered via the input means 11, where the blanks Z are optimized over all workpieces W, and store the individual patterns M allocating to the respective workpieces W. As workpiece identifiers, the contour U and/or the applied markings F of the respective workpiece W are used.

For cutting out the blanks Z themselves, the workpieces W are individually removed from the temporary storage device 4 and placed on the working surface 6 of the cutting means 5 in any order. The camera 9 again detects the contour U and the markings F of the workpiece W and also the actual position of this contour and these markings with respect to the working surface 6 represented by a system of coordinates X, Y. and enters the data into the computer 10. On the one hand, the same now determines the actual position I in the system of coordinates X, Y, and on the other hand finds out the pattern M associated with the respective workpiece W by comparing the contour U and/or marking F with the stored contours U and/or markings F, and provides such pattern in a position adjusted relative to the coordinate position of the contour U and/or marking F for the control program so as to produce activate the cutting means 5. For the actual cutting operation, this pattern M is then processed to the corresponding control program and delivered to the control means 8, which activates the cutting unit 7 for cutting the workpiece W according to the pattern M.

To improve the preparation of the patterns, blanks Z interactively combined to groups can be provided to the computer 10 via the input means 11, which computer will then perform the further nesting operation on the basis of these blank groups as unit E together with the remaining individual blanks Z.

Figure 3:
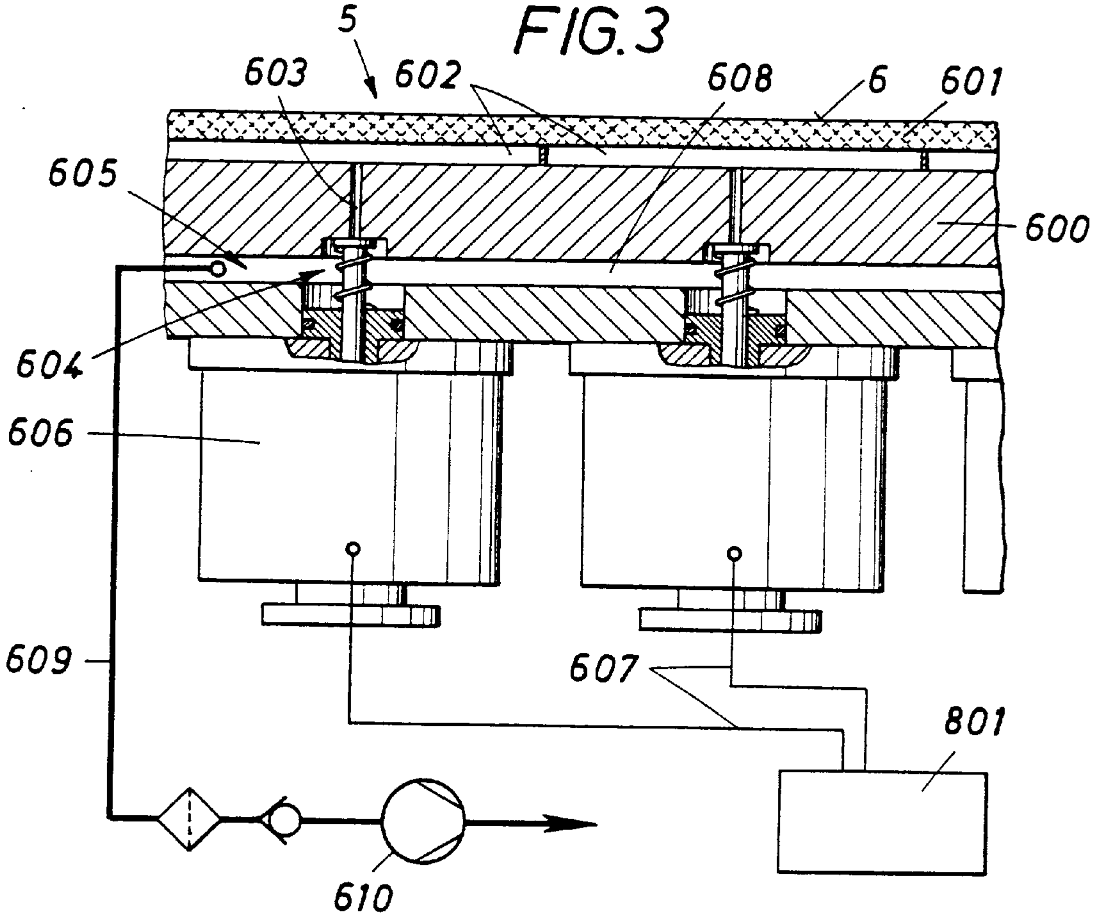
FIG. 3 represents part of the cutting table of the cutting means constituting the working surface in a cross-section on an enlarged scale.
Figure 2:
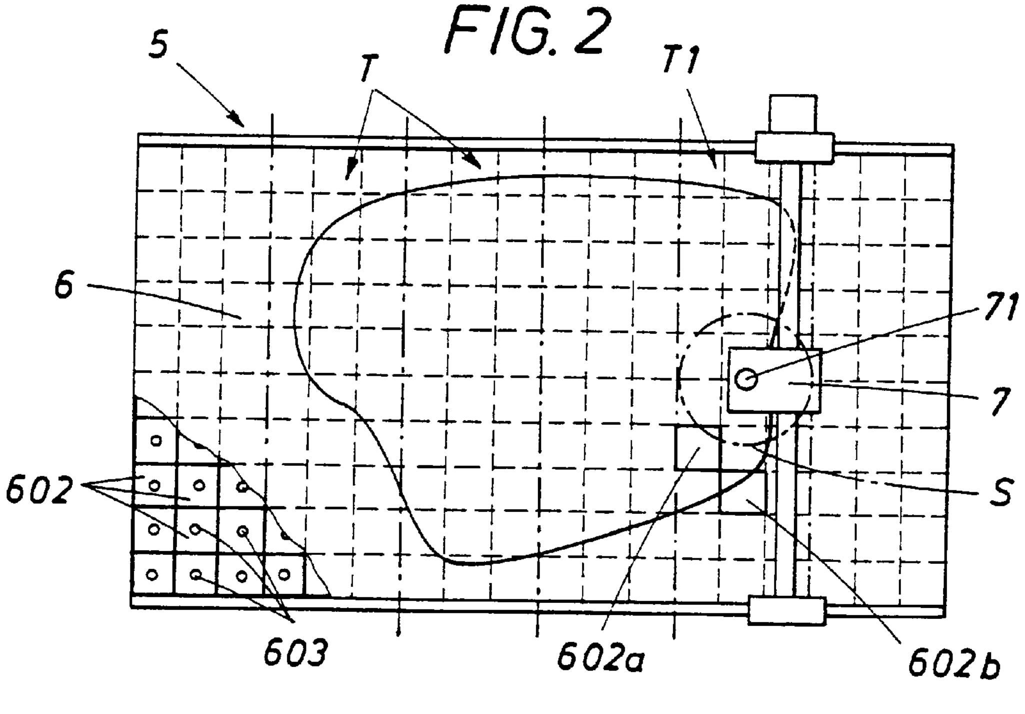

In accordance with FIG. 2 and 3, the cutting means 5 comprises a cutting table 600 constituting the working surface 6. To hold down the workpieces W placed on the working surface 6, a vacuum is applied through a plurality of suction zones 602 arranged one beside the other in a raster and covered by an air-permeable supporting plate 601, which suction zones are each connected to a vacuum source 605 via a suction hole 603 and a shutoff member 604. The shutoff members 604 for instance consist of solenoid valves 606, which can be activated by a control means 801 via control lines 607, so that the suction zones 602 can be individually subjected to a vacuum by correspondingly activating the shutoff members 604, where by means of a vacuum line 609 connecting a vacuum pump 610 to the cavity 608 of the cutting table 601 so as to maintain the required vacuum in vacuum source 605.

When the data of the contours and actual positions of the workpieces W placed on the working surface 6, which were optically detected by the camera 9, are utilized by the computer 10 also for activating the control means 801, the shutoff members 604 can be activated individually, so that only those suction zones 602 are subjected to a vacuum which are disposed in the area of the workpiece W, so that on the one hand a proper support of the workpieces is ensured, but on the other hand the vacuum source is not endangered by excessive amounts of secondary air.

To ensure a more specific adapation of the respective suction efficiency to the cutting operation, the suction zone 602 can additionally be subdivided into partial areas T, and the computer 10 can be programmed such that the suction zones are subjected to a vacuum only in partial areas, namely in dependence on the cutting line, i.e. for instance only in the partial area T1, in which the cutting tool 71 of the cutting unit 7 is disposed. Only in this partial area will the suction zones 602 be activated in the area of the workpiece W, all other suction zones remain inactive. In the transition from one partial area to another, adjacent partial areas can overlappingly be activated, so as to avoid any interruptions of the workpiece support when moving from one partial area to another.

A further improvement in the application of a vacuum is achieved in that during cutting the computer 10 will apply a vacuum to the suction zones completely lying within the application area, for instance to the suction zone 602*a*, for the entire cutting period via the control means 801, but to the suction zones only partly protruding into the application area, for instance the suction zone 602*b*, only in dependence on the cutting line, i.e. for instance within the activated partial area T1.

A possibility for an expedient application of a vacuum is also achieved in that the computer 10 applies a vacuum to the suction zones via the control means 801 within a certain area S around the cutting tool 71, so that only the suction zones lying in the area of the cutting line are activated, and the others are not.

I claim:

1. A method of cutting out blanks from workpieces of a sheet material, in particular leather, having an irregular contour and characteristic features including flaws, which comprises the steps of (a) spreading the workpieces on a supporting surface of an imaging apparatus, (b) assigning a workpiece identifier to each spread workpiece, (c) optically detecting the contour of the workpieces, and the workpiece identifiers to obtain data corresponding to the detected contour and workpiece identifiers, (d) obtaining data corresponding to markings of the characteristic features of the workpieces, (e) entering the obtained data into a computer having a memory having stored therein data as to number, contour and quality requirements of the blanks, the computer being programmed to compute a pattern on the basis of the entered and stored data, (f) storing the computed pattern and allocating the stored pattern to the workpieces identified by the workpiece identifiers, (g) placing a respective one of the workpieces on a working surface of a cutting apparatus, (h) optically detecting the contour of the one workpiece, the markings, the workpiece identifier and a determined position thereof to obtain data corresponding to the detected contour, markings, workpiece identifier and determined position, (i) entering the obtained data into the computer, the computer being programmed to compute the determined position and to select the stored pattern allocated to the one workpiece, (j) recalculating the stored pattern in relation to the actual position of the one workpiece, (k) repositioning sections of the one workpiece, if misaligned, and (l) cutting the one workpiece under the control of a control program responsive to the selected stored pattern allocated to said workpiece.

2. The method of claim 1, wherein, in the absence of conformity of the contour and markings of the one workpiece with the stored workpiece identifier, the computer is programmed to select a stored pattern allocated to a respective one of the workpieces identified by the workpiece identifier least deviating from the contour and markings of the one workpiece, and to recalculate the stored pattern accordingly.

3. The method of claim 1, wherein, in the case of a mere partial conformity of the contour and markings of the one workpiece with the stored workpiece identifier, the computer is programmed to select a stored pattern allocated to a respective one of the workpieces identified by the workpiece identifier having the largest conformity with the contour and markings of the one workpiece, and to recalculate the stored pattern accordingly.

4. The method of claim 1, wherein, in the case of a mere partial conformity of the contour and markings of the one workpiece with the stored workpiece identifier, the computer is programmed to select a stored pattern allocated to a respective one of the workpieces identified by the workpiece identifier having the largest conformity with the contour and markings of the one workpiece, and the computer is programmed to request a repositioning of the one workpiece in a deviating portion thereof, and to recalculate the stored pattern accordingly.

5. The method of claim 4, wherein the computer is programmed to request the repositioning while indicating the selected contour and markings.

6. The method of claim 1, wherein the computer is programmed to select and at least partially display the contour of the stored pattern allocated to the one workpiece comprising the further steps of placing the one workpiece on the supporting surface, detecting the identifier thereof, displaying the contour thereof with a projector, matching the displayed contour with the actual contour of the one workpiece, if necessary replacing sections of the one workpiece to obtain an optimum matching, using the matching projection data to reprogram the stored pattern according to the actual position of the one workpiece, and cutting the one workpiece.

7. The method of claim 1, wherein the computer is programmed to select from the stored patterns a pattern allocated to the one workpiece, and to convert the stored contour of the allocated pattern for adjustment to detected contour of the one workpiece if the detected contour deviates from the stored contour.

8. The method of claim 1, wherein each workpiece is classified according to a predetermined one of the workpiece identifiers, and the computer is programmed to compute a corresponding one of the patterns.

9. The method of claim 8, wherein the computer is programmed to computing the corresponding pattern in dependence on the contour of the one workpiece.

10. A method of cutting out blanks from workpieces of a sheet material, in particular leather, the workpieces having a contour and the method comprising the steps of (a) placing the workpieces on a working surface of a cutting apparatus, the working surface being comprised of a raster of a plurality of adjacent suction zones, (b) connecting a vacuum source to the suction zones, (c) applying vacuum from the vacuum source to selected ones of the suction zones to hold the workpieces on the working surface in a predetermined position, (d) optically detecting the contour and the position of a respective one of the workpieces to obtain data corresponding to the detected contour and position, and (e) entering the obtained data into a computer programmed to control the application of vacuum only to those suction zones selected to correspond to the detected contour and position of the workpiece occupying an area of the working surface.

11. The method of claim 10, wherein the vacuum source is connected to the suction zones by shutoff members, and the shutoff members are controlled by the computer in response to the obtained data.

12. The method of claim 10, wherein the raster of the working surface is divided into working surface portions, and the computer is programmed to control the application of vacuum to the suction zones in the working surface portion selected in dependence on a cutting line.

13. The method of claim 10, wherein the computer is programmed to control the application of vacuum during cutting to those suction zones fully within an area of the working surface occupied by the one workpiece, and to control the application of vacuum to the suction zones partially within said area only in dependence of a cutting line.

14. The method of claim 10, wherein the cutting apparatus comprises a cutting tool, and the computer is programmed to control the application of vacuum to those suction zones within a predetermined area surrounding the cutting tool.

* * * * *